United States Patent [19]

Pearson et al.

[11] Patent Number: 4,989,895
[45] Date of Patent: Feb. 5, 1991

[54] OCCUPANT RESTRAINT SYSTEM

[75] Inventors: Jeffery L. Pearson, Rochester; Gregory A. Miller, Troy; John D. Horsch, Rochester Hills, all of Mich.

[73] Assignee: General Motors Corporation, Detroit, Mich.

[21] Appl. No.: 511,364

[22] Filed: Apr. 19, 1990

[51] Int. Cl.5 .................. B60R 21/22; B60R 21/28
[52] U.S. Cl. ................................. 280/731; 280/739
[58] Field of Search .................. 280/728, 730, 731, 280/737, 739, 739, 743, 741, 777, 736

[56] References Cited
U.S. PATENT DOCUMENTS 3,747,953 7/1973 Goes .................................. 280/739
3,758,133 9/1973 Okada ............................... 280/739
3,774,932 11/1973 Schiesterl ......................... 280/731
3,884,499 5/1975 Oka .................................... 280/739

FOREIGN PATENT DOCUMENTS 3126079 4/1982 Fed. Rep. of Germany ...... 280/731
49-72839 7/1974 Japan ................................. 280/739

Primary Examiner—Charles A. Marmor
Assistant Examiner—Karin Tyson
Attorney, Agent, or Firm—Herbert Furman

[57] ABSTRACT

An occupant restraint system includes a module having a support provided with openings therethrough which are normally closed by rupturable diaphragms when the pressure within the cushion exceeds a predetermined limit, the reaction force on the module moves the diaphragms into engagement with rupture pins to rupture the diaphragms and vent the cushion to ambient through the support.

11 Claims, 2 Drawing Sheets

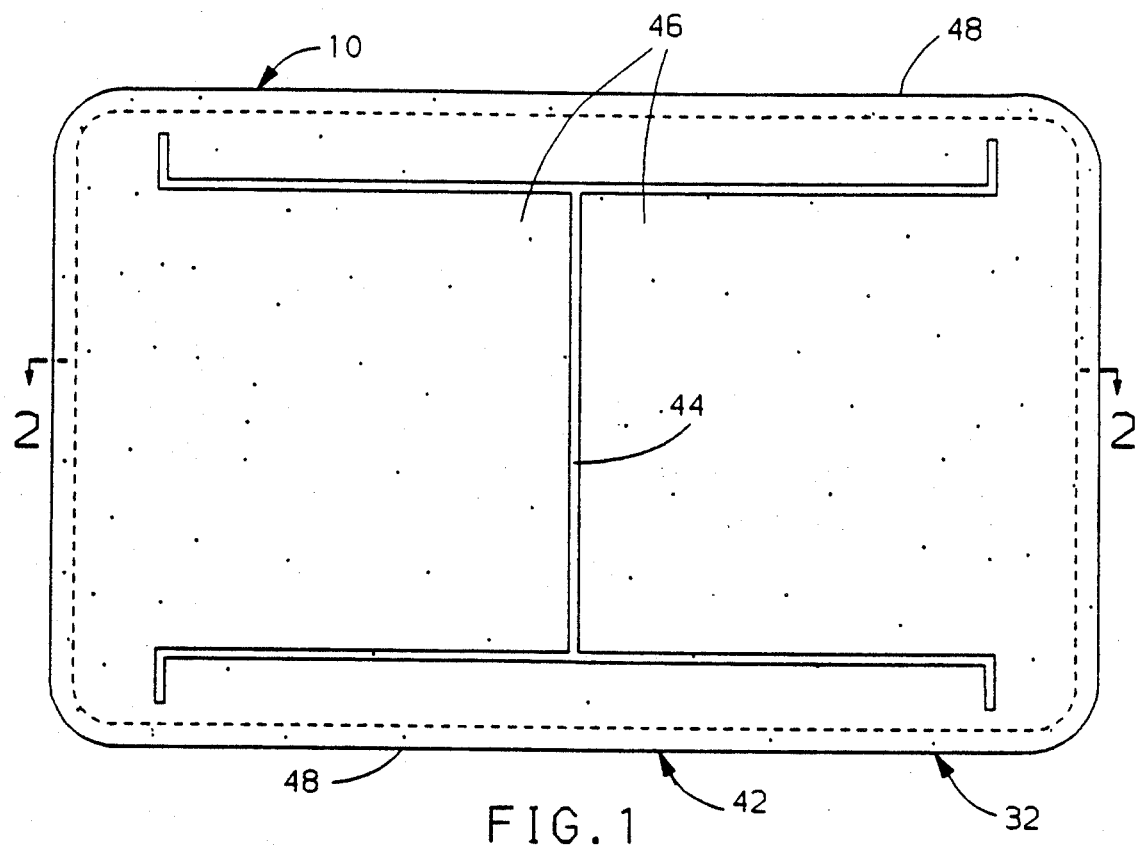
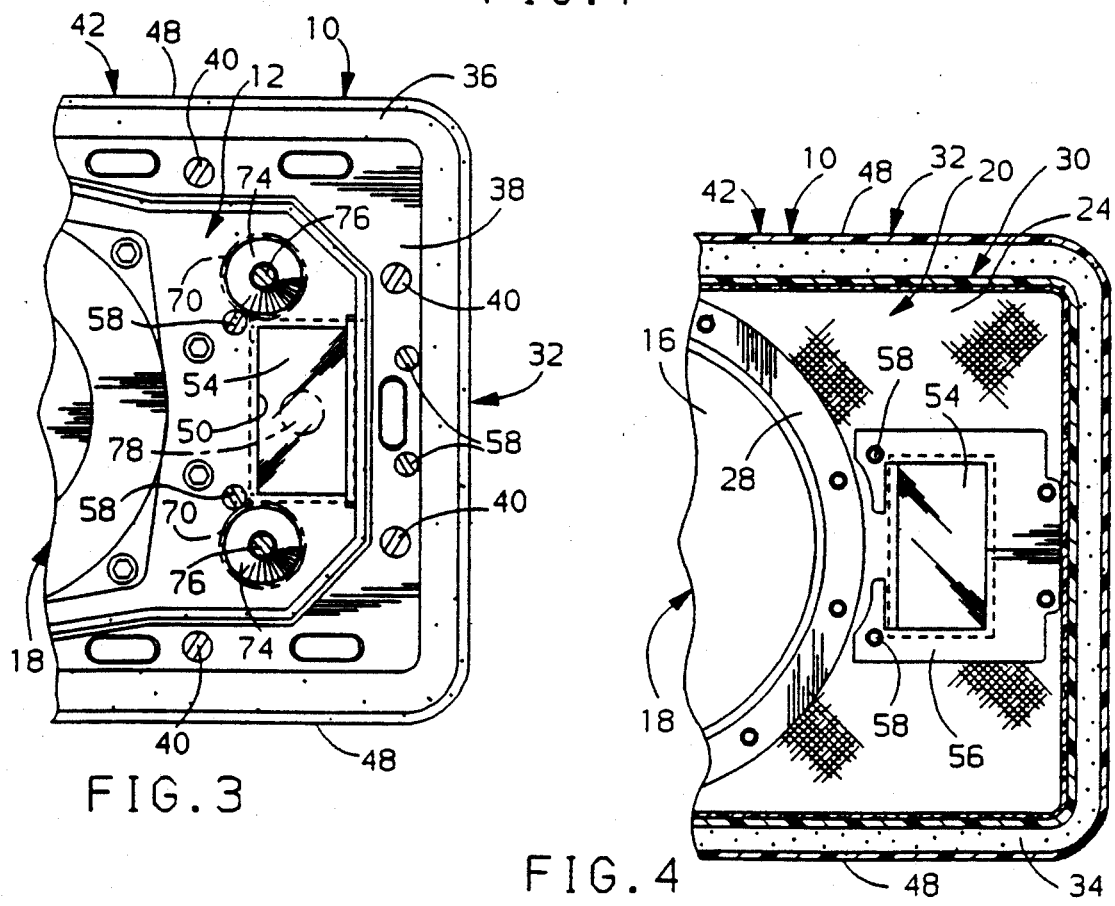

OCCUPANT RESTRAINT SYSTEM

BACKGROUND OF THE INVENTION

This invention relates generally to occupant restraint systems and more particularly to an occupant restraint system having a vent means for venting the deploying cushion to ambient when the pressure within the cushion exceeds a predetermined level.

It is well known to vent deploying occupant restraint cushions to ambient through the use of various types of openings or vents in the cushion. Such vents may be open throughout deployment of the cushion or may be opened only upon the attainment of certain pressure levels within the deploying cushion. The venting of the cushion to ambient reduces the pressure within the deploying cushion to the desired level.

The venting of the cushion in accordance with this invention may be termed force actuated venting since the venting of the deploying cushion to ambient occurs when the reaction force generated by internal cushion pressure resulting from the engagement of the occupant and the deploying cushion exceeds a predetermined level.

In the preferred embodiment of the invention, the cushion, source of pressure fluid, and enclosure for the source and cushion are mounted to a support to provide a module. The support is provided with vent openings therethrough which communicate the interior of the cushion with ambient. These vent openings are of a predetermined size to attain a predetermined vent area. The vent openings are closed by overlying rupturable diaphragms, such as thin glass members mounted to the support around the openings. The module is mounted to the vehicle, such as the hub portion of a vehicle steering wheel, by force collapsible means, such as mesh columns of the type commonly used in energy absorbing steering columns or collapsible cell type material. The vehicle also mounts rupture means, such as rupture pins or struts, having free pointed ends located in aligned relationship to the diaphragms and a predetermined distance therefrom.

When the deploying cushion is engaged by the occupant, the pressure within the cushion normally rises and results in a predetermined reaction force on the support. Should the reaction force on the support exceed a predetermined level, it will start to collapse the force collapsible means. Should the support move through the predetermined distance between the diaphragms and the free ends of the pins or struts, ends of the pins or struts will engage and rupture the diaphragms to vent the deploying cushion to ambient through the support.

Since the reaction force on the support results from the internal pressure of the deploying cushion generated by engagement of the cushion and the occupant, it is a direct measure of the force applied by the cushion to the occupant. By venting the cushion to ambient in accordance with the level of the reaction force, the force applied by the cushion to the occupant can be maintained within predetermined limits. By sizing the openings in the support, setting the force at which the collapsible means collapses, and setting the distance between the diaphragms and the rupture pins or struts, the internal pressure within the deploying cushion and in turn, the force applied by the cushion to the occupant, can be maintained within predetermined limits.

The primary feature of this invention is that it provides an occupant restraint system for venting a deploying cushion to ambient through the support for the deploying cushion in accordance with the reaction force on the support generated by internal cushion pressure resulting from engagement of the deploying cushion with a vehicle occupant. Another feature is that the venting occurs through rupturable vents in the support which communicate the deploying cushion with ambient through the support. A further feature is that the vents are closed by rupturable diaphragms which are ruptured by movement of the support relative to the vehicle when the reaction force on the support exceeds a predetermined limit. Yet another feature is that the support is mounted on the vehicle by force collapsible means and the force collapsible means must collapse a predetermined distance before the diaphragms are ruptured. Yet a further feature is that the rupturable diaphragms engage and are ruptured by rupture pins or struts on the vehicle when the support has moved through the predetermined distance. Still another feature is that the rupturable diaphragms are formed of thin glass members mounted to the support around openings therethrough. Still a further feature is that the cushion, the source of pressure fluid for deploying the cushion, and the enclosure for the cushion and source, are mounted to the support to provide a module which is mounted to the vehicle by columnar type force collapsible means in spaced relationship to the pins or struts of the vehicle. These and other features of this invention will be apparent from the following specification and drawings wherein:

FIG. 1 is a top plan view of an occupant restraint system according to this invention.

FIG. 3 is a view taken along line 3—3 of FIG. 2, and

FIG. 4 is a sectional view taken along line 4—4 of FIG. 2.

Figure 2:
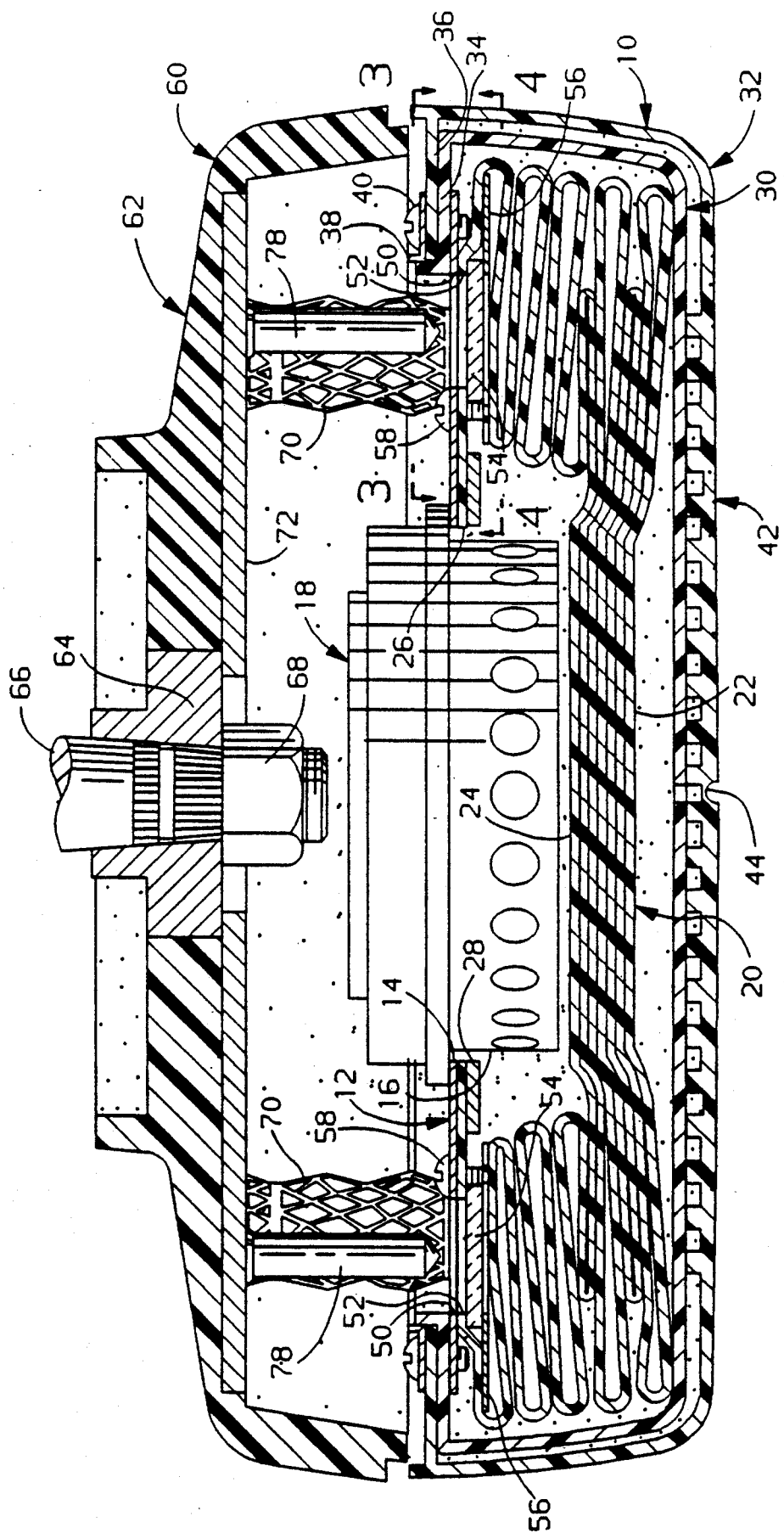
FIG. 2 is an enlarged sectional view taken along line 2—2 of FIG. 1.

The occupant restraint system 10 shown in the drawings is similar in many respects to that disclosed in detail in co-pending application Ser. No. 270,609, U.S. Pat. No. 4,903,986 Cok et al, Modular Occupant Restraint System, filed Nov. 14, 1988 and assigned to the assignee of this invention. Therefore, only a brief description of the components thereof will be given herein.

The system 10 includes a generally rectangularly shaped member or support 12 having a central circular opening 14, FIG. 2, which receives the outlet portion 16 of an inflator or gas generator 18 therethrough. A flange of the inflator is secured to the support 12 around the opening 14 in a conventional manner. A folded occupant restraint cushion 20 includes upper or forward and lower or rearward circular cushion members 22 and 24, respectively, which are conventionally secured together at their circular edge portions and folded to fit on the support 12. The upper cushion member 22 provides the impact surface of the cushion for the vehicle occupant when the cushion is inflated by the gas generator 18. The lower cushion member 24 has a central circular opening 26 of the size of the opening 14. The lower cushion member 24 is secured to the support 12 around the opening 14 by a circular ring 28 fastened to the support through the lower member 24. An enclosure for the cushion and generator includes a generally rectangularly shaped box-like container 30 and a like shaped outer cover 32 having respective flanges 34 and 36, FIG. 2, which underlie the edges of the support 12 and are secured thereto by a retainer ring 38 and bolts 40. The cushion 20, gas generator 18, container 30 and cover 32 are thus assembled to the support 12 to provide a unit or module 42.

The upper wall of the cover 32 is provided with a molded-in split line 44, FIG. 1, and the upper wall of the container 30 is provided with a like shaped line of perforations, not shown, which permit the upper walls of the container and cover to separate into like pairs of oppositely opening flaps 46 under the force of the inflating cushion 20 to permit the cushion to deploy toward the vehicle occupant. Other embodiments of the split line 44, as shown in the Cok et al application, may be used to divide the upper wall of the cover into oppositely opening flaps as well as divide the longer or 6 and 12 o'clock side walls 48 of the cover into oppositely opening flaps. The line of perforations in the upper wall and side walls of the container is generally aligned with the molded in line of the cover so that the flaps of the cover and container are arranged in like pairs. Although this invention has been shown and described in conjunction with an enclosure including both a container and a cover, other enclosures may be used as long as such enclosures are part of the module 42.

The support 12 is provided with a pair of openings 50, each being located between the opening 14 and one of the shorter or 3 and 9 o'clock edges of the support and diametrically opposite of the other. The openings 50 are shown generally rectangular in shape but may be of other shape. The lower cushion member 24 is provided with openings 52, each being aligned with one of the openings 50. The aligned pairs of openings 50 and 52 provide vents communicating the interior of the cushion 20 with ambient through the support 12 when the vents are opened as will be described. A thin glass member or diaphragm 54 seats on the lower cushion member 24 over each of the aligned pairs of openings 50 and 52. A frame 56 is secured at 58 to the support 12 around each of the glass members 54 to secure each of the glass members in place over the aligned pairs of openings 50 and 52 and maintain the vents provided by such pairs of openings normally closed.

The module 42 is mounted on the hub portion 60, FIG. 2, of a vehicle steering wheel 62. The hub portion has an upper opening of the general shape of the support 12 and includes a lower splined bushing 64 which receives the upper splined end of the steering shaft 66 and is bolted thereto at 68 to secure the steering wheel to the vehicle steering system. The steering shaft is part of the energy absorbing steering column of the vehicle.

Pairs of collapsible tubular mesh members 70 seat between the support 12 of module 42 and a plate 72, FIG. 2, in the base of the hub portion 60 of the steering wheel 62. The members 70 of each pair are generally located oppositely the shorter sides of each frame 56. The support 12 is provided with conically shaped embossments 74, FIG. 3, each of which projects within one end of a respective member 70 and mounts an internally tapped strut 76 extending axially through the member 70 and receiving a fastener, not shown, which extends upwardly through an opening in the hub portion 60 to secure the mesh member 70 in place between the support 12 and plate 72. The mesh members 70 locate the module 42 within the opening of the hub portion 60 and locate the support 12 a predetermined distance relative to the plate 72. A conically headed or pointed rupture pin or strut 78 is mounted on the plate 72 in alignment with the center portion of each glass member 54. The apices of the conical pins or struts 78 are located a predetermined distance from the glass members 54.

When acceleration or velocity or other type sensors sense the impact of other vehicle with an obstacle or the possibility or probability of such an impact, the gas generator 18 is actuated, such as by receiving an electrical signal from a power source, to generate gas or pressure fluid which exits the outlet portion 16 of the inflator into the interior of the folded cushion 20. The pressure fluid initiates deployment of the cushion outwardly of the module 42 through the flaps 46 in the upper wall of the cover 32 and like flaps in the upper wall of the container 30. Should the internal pressure in the deploying cushion rise above a predetermined level due to engagement of the cushion with the occupant, the resultant reaction force on the support 12 will be in a direction tending to move the support 12 and module 42 within the hub portion 60 or downwardly of the vehicle. If the reaction force exceeds a predetermined level, the support 12 will start to collapse the mesh members 70. Once the support 12 has moved through the predetermined distance separating the pointed ends of the rupture pins or struts 78 and the glass members or diaphragms 54, the glass members will be ruptured and the interior of the cushion will be vented to ambient through the openings 50 and 52 of the support 12 and lower cushion member 24. This venting to ambient will reduce the pressure within the deploying cushion 20 to maintain the force applied by the cushion to the occupant within predetermined limits.

The reaction force on the support 12 is generated by the internal pressure within the deploying cushion 20 and is therefore a direct measure of the force applied by the cushion to the occupant. During most engagements of the occupant with the deploying cushion 20, the internal pressure of the cushion will not generate sufficient reaction force on the support 12 to cause collapse of the mesh members 70. The mesh members can be set to collapse at a predetermined force, such as 2 kN, and the distance between the pointed ends of the rupture pins 78 and the glass members or diaphragms 54, such as 1.3 mm, can be set so that the force applied by the cushion to the occupant can be controlled within a limited range. Further, the force actuated venting arrangement of this invention can be used with both nonvented cushions as well as cushions which are vented to ambient in various known manners.

Thus, this invention provides an occupant restraint system having force actuated venting of the cushion to ambient when the internal pressure within the cushion exceeds a predetermined limit in order to control the force applied by the deploying cushion to an occupant.

The embodiments of the invention in which an exclusive property or privilege is claimed are defined as follows:

1. In a vehicle, a modular occupant restraint for a vehicle occupant comprising, a support, a source of pressure fluid mounted to the support, a folded occupant restraint cushion mounted to the support in communication with the source of pressure fluid, the pressure fluid inflating the cushion and deploying the cushion relative to the support for engagement by the vehicle occupant, an enclosure for the source of pressure fluid and cushion mounted to the support, rupturable vent means in the support in communication with the cushion and ambient, the support, source, cushion and enclosure providing a module, means mounting the module on the vehicle for movement relative thereto upon the application of a predetermined force to the module, and means rupturing the vent means to communicate the cushion with ambient through the support upon the application of the predetermined force to the module resulting from the engagement of the deploying cushion by the vehicle occupant.

2. In a vehicle, an occupant restraint for a vehicle occupant comprising, a support, a source of pressure fluid mounted to the support, a folded occupant restraint cushion mounted to the support in communication with the source of pressure fluid, the pressure fluid inflating the cushion and deploying the cushion relative to the support for engagement by the vehicle occupant, rupturable vent means in the support in communication with the cushion and ambient, energy absorbing means mounting the support on the vehicle for movement relative thereto upon the application of a predetermined force to the support, and means rupturing the vent means to communicate the cushion with ambient through the support upon the application of the predetermined force to the support resulting from the engagement of the deploying cushion by the vehicle occupant.

3. The combination comprising, a vehicle steering wheel including an upwardly opening hub portion, a modular occupant restraint including, a support, a source of pressure fluid mounted to the support, a folded occupant restraint cushion mounted to the support in communication with the source of pressure fluid for inflation of the cushion and deployment of the cushion relative to the support for engagement by a vehicle occupant, rupturable vent means in the support in communication with the cushion and the hub portion, means mounting the support over the opening of the hub portion of the steering wheel for movement relative thereto upon the application of a predetermined force to the support, and means rupturing the vent means to communicate the cushion with the hub portion upon the application of the predetermined force to the support resulting from the engagement of the cushion by a vehicle occupant.

4. In a vehicle, an occupant restraint for a vehicle occupant comprising, a support having openings therethrough, a source of pressure fluid mounted to the support, a folded occupant restraint cushion mounted to the support in communication with the source of pressure fluid and the support openings, the pressure fluid inflating the cushion and deploying the cushion relative to the support for engagement by the vehicle occupant, rupturable means closing the support openings to block communication of the cushion with ambient through the support openings, means mounting the support on the vehicle for movement relative thereto upon the application of a predetermined force to the support, and means rupturing the rupturable means to communicate the cushion with ambient through the support openings, upon the application of the predetermined force to the support resulting from the engagement of the deploying cushion by the vehicle occupant.

5. In a vehicle, an occupant restraint for a vehicle occupant comprising, a support having at least one opening therethrough, a source of pressure fluid mounted to the support, a folded occupant restraint cushion mounted to the support in communication with the source of pressure fluid and the support openings, the pressure fluid inflating the cushion and deploying the cushion relative to the support for engagement by the vehicle occupant, a diaphragm of rupturable material closing the opening in the support and blocking communication of the cushion with ambient through the support opening, means mounting the support on the vehicle for movement relative thereto upon the application of a predetermined force to the support, and means rupturing the diaphragm to communicate the cushion with ambient through the support opening upon the application of the predetermined force to the support resulting from the engagement of the deploying cushion by the vehicle occupant.

6. The combination recited in claim 5 including sealing means sealing the diaphragm to the support around the opening therethrough.

7. The combination recited in claim 5 wherein the support is generally rectangularly shaped and includes a pair of vent openings arranged on opposite sides of a central opening therein receiving the source of pressure fluid, each vent opening being closed by a diaphragm of rupturable material.

8. The combination recited in claim 5 wherein the support has at least a pair of openings arranged symmetrically of the support and source of pressure fluid, and sealing means are provided to seal the diaphragms to the support adjacent each of the openings.

9. The combination recited in claim 5 wherein the rupturing means is fixed to the vehicle and is engageable by the diaphragm to rupture the diaphragm.

10. The combination recited in claim 5 wherein the mounting means for the support includes energy absorbing means to set the predetermined force required to move the support relative to the vehicle.

11. The combination recited in claim 5 wherein the rupturing means is fixed to the vehicle in spaced relationship to the diaphragm, and the mounting means for the support includes collapsible energy absorbing means requiring a predetermined force to collapse.

* * * * *